United States Patent [19]

Takano

[11] Patent Number: 4,795,328

[45] Date of Patent: Jan. 3, 1989

[54] ENCAPSULATION APPARATUS

[75] Inventor: Motoharu Takano, Tokyo, Japan

[73] Assignee: Q.P. Corporation, Japan

[21] Appl. No.: 88,955

[22] Filed: Aug. 24, 1987

[30] Foreign Application Priority Data

May 6, 1987 [JP] Japan .................................. 62-108860

[51] Int. Cl.⁴ .............................. B01J 206; B01J 2/08; B29C 67/00
[52] U.S. Cl. ........................................... 425/5; 425/10
[58] Field of Search ...................... 425/5, 6, 10; 264/4, 264/5

[56] References Cited

U.S. PATENT DOCUMENTS 2,428,911 10/1947 Gunnel .................................... 425/5
2,766,478 10/1956 Raley et al. ............................. 425/5
4,063,856 12/1977 Dziedzic ................................. 425/5
4,251,195  2/1981 Suzuki et al. ........................... 425/5
4,422,985 12/1983 Morishita et al. ...................... 425/5
4,481,157 11/1984 Morishita et al. ...................... 425/5

*Primary Examiner*—Willard Hoag
*Attorney, Agent, or Firm*—Jordan B. Bierman

[57] ABSTRACT

Encapsulation apparatus for forming capsules by dropping a coagulatable mixture into a coagulation tank, including a dropping tank with a perforated bottom and a coagulation tank beneath the dropping tank. The dropping tank has a shallow mid-section and deeper portions at the inlet and discharge ends. Pumps provide circulation between the discharge and inlet ends of the coagulation tank.

7 Claims, 4 Drawing Sheets

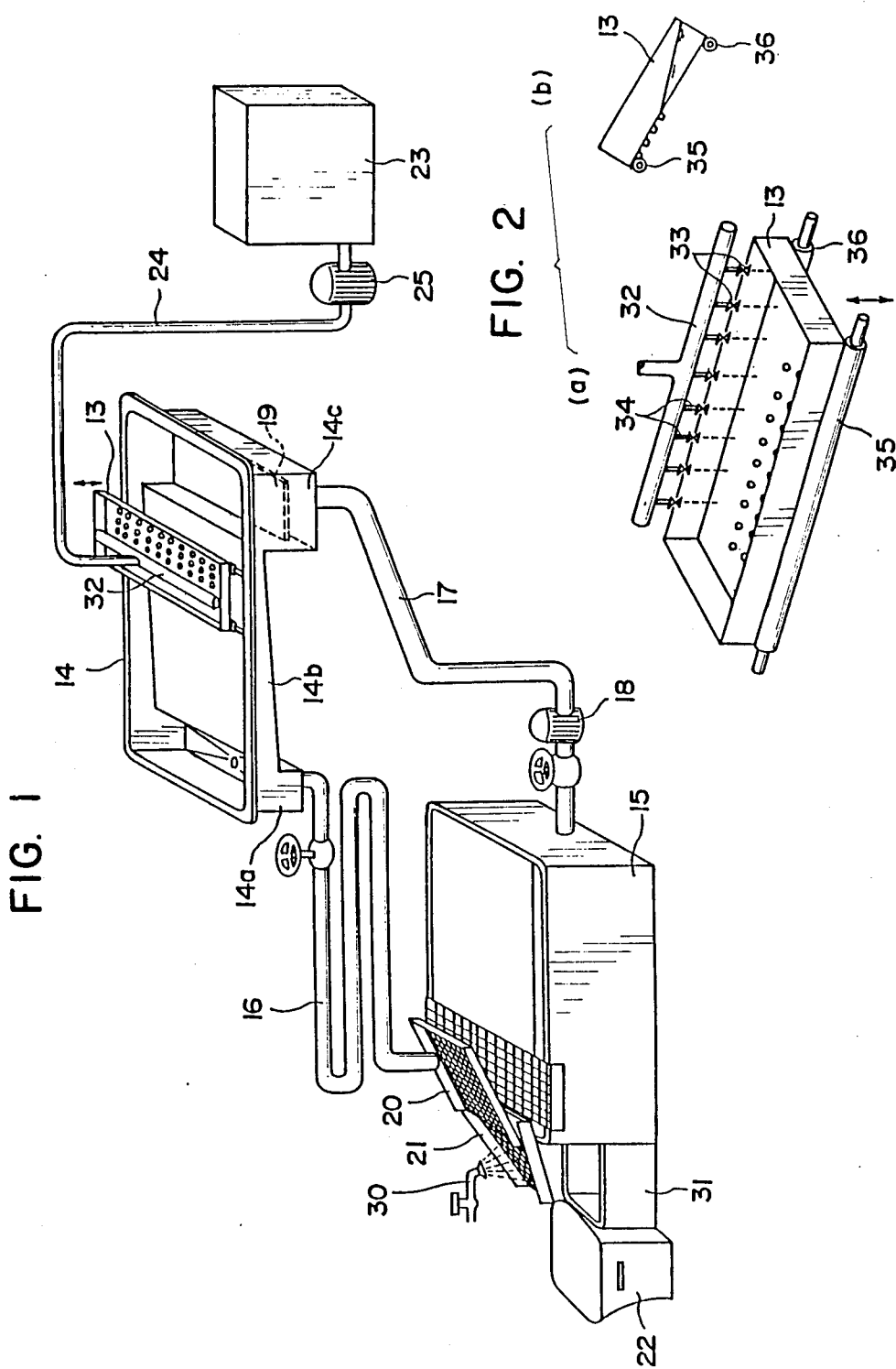

ics such as alginic acid or pectin to form a film of calcium alginate or the like on the surface of the material solution. The resulting product includes the uncoagulated material solution encapsulated inside the coagulated film. The encapsulated product is hereinafter referred to as "capsules". Since the thus obtained capsules have different compositions of the inside material and the film, they have a feature that when the film is broken by teeth, as for the case of citrus fruits, for example, the flavor of the contents spreads in the mouth. However, this method has a problem that since the capsules during the chemical reaction between the material solution drops and the coagulating solution still have a stickiness, the capsules may adhere to each other to agglomerate into lumps. For example, Japanese Patent Publication No. 31183/1983 describes an apparatus for continuously producing capsules. It was noted that in this apparatus the capsules impinge against each other to agglomerate in the coagulating solution during the coagulation process. In the apparatus, as shown in FIG. 7, a material solution is added dropwise from a pressurized dropping tank 5 to a coagulation tank 6 to coagulate into capsules. The coagulation tank 6 is a hopper-shaped deep vessel which is provided with an electric fan disposed on the bottom surface to stir the capsules. The capsules, after staying for an adequate period of time in the coagulation tank 6, flow into a film formation tank 7 where the capsules stay for an adequate period of time. The film formation tank 7 is provided on its bottom surface with an electric fan to stir the capsules. The capsules discharged from the film formation tank 7 are separated from the coagulating solution by means of a conveyor 8 and then fed into a subsequent process. Thus, because the material solution is added dropwise into the deep coagulation tank 5, and the capsules during the coagulation process are agitated by the electric fan, the capsules are liable to adhere to each other to form lumps. To eliminate such a problem, the dropping rate of the material solution per unit of time can be reduced, however, this results in a deterioration of productivity. Further, because the time of staying in the coagulation tank 5 differs between individual capsules (ranging from about 10 to 60 seconds), there results a mixture of overreacted capsules and unreacted capsules. Moreover, this apparatus requires conveyors 8 and 9, the electric fan, and a pressure controlling device, resulting in an increased manufacturing cost.

With a view to obviate all of the conventional art defects of encapsulation apparatus, it is a primary object of the present invention to provide a low-cost encapsulation apparatus which can produce capsules with enhanced efficiency, without agglomeration of the capsules.

ENCAPSULATION APPARATUS

BACKGROUND OF THE INVENTION

1. Field of the Invention

This invention relates to an encapsulation apparatus for producing capsules by coagulating liquid or sol foods such as dressings, alcoholic drinks, or fruit juice (hereinafter generically referred to as "dressings").

2. Description of the Conventional Art

Since dressings are generally in the state of liquid or sol, there are a variety of limitations in using or taking the dressings. However, the dressings have not always to be used in the form of liquid or sol, but they just have been used in such a traditional or customary manner. Thus, the dressings have become to be processed by solidifying into granular or spherical shapes of an adequate size to expand the use of the dressings. To solidify the dressings, there has been generally known a method which uses a cross-linking reaction to form a film on the surface of the dressings. In the method, a calcium salt is added to the dressings to obtain a material solution which is added dropwise into a coagulating solution consisting mainly of a polysaccharide such as algin-

SUMMARY OF THE INVENTION

In accordance with the present invention which attains the above object, there is provided an encapsulation apparatus for producing capsules by circulating a coagulating solution through a coagulation tank and adding dropwise a material solution from a dropping tank into the coagulating solution flowing in the coagulation tank. The dropping tank is provided with small holes projecting downward at the bottom surface of the dropping tank. The dropping tank is further provided with a material solution supply pipe disposed along the longitudinal direction of the dropping tank to supply the material solution to the dropping tank. The material solution supply pipe is provided with a plurality of nozzles having flow control valves. The coagulation tank comprises a shallow-bottomed section disposed directly beneath the dropping tank and deep-bottomed sections disposed at the upstream and downstream of the shallow-bottomed section.

With such an arrangement of the encapsulation apparatus according to the present invention, by adjusting the flow control valve of the individual nozzles provided on the material solution supply pipe, even a high-viscosity material solution can be uniformly fed so that the liquid level is even over the whole parts of the dropping tank.

The material solution can be dropped vertically at a consistent rate from the small holes provided projecting downward on the bottom surface of the dropping tank, without flowing along the bottom surface, thereby producing capsules of a uniform diameter.

BRIEF DESCRIPTION OF THE DRAWINGS

FIGS. 1 through 6 relate to an embodiment of the encapsulation apparatus according to the present invention.

FIG. 1 is a schematic view showing the entire structure of the embodiment.

FIGS. 2(a) and 2(b) are an oblique view and a sectional view, respectively, of a dropping tank.

FIG. 3 is a plane view of the dropping tank and a coagulation tank.

FIG. 4 is a vertical sectional view of the coagulation tank.

FIG. 5 is a schematic side view of the dropping tank.

FIG. 6 is a schematic view showing the structure of a small hole projecting downward.

DESCRIPTION OF THE PREFERRED EMBODIMENT

Figure 3:
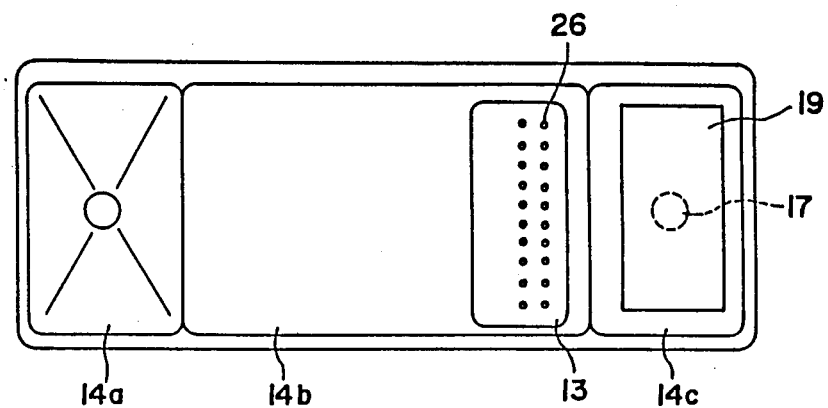
Figure 4:
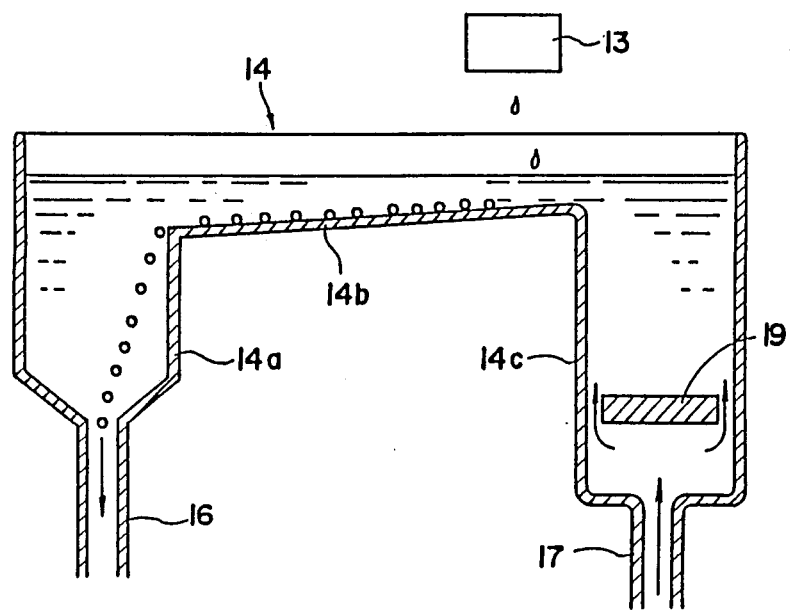

A preferred embodiment of the encapsulation apparatus according to the present invention will be described in detail with reference to the drawings. Referring to FIG. 1 through FIG. 6 showing the structure of the embodiment, the encapsulation apparatus according to the present invention comprises a dropping tank 13, a coagulation tank 14, and accessory devices of the tanks. A feed pipe 17 and a discharge pipe 16 are disposed between the coagulation tank 14 and a storage tank 15 so that a coagulating solution is circulated between the coagulation tank 14 and the storage tank 15 which is disposed beneath the coagulation tank 14. A pump 18 is disposed in the feed pipe 17. The coagulation tank 14 includes a shallow-bottomed section 14b, and deep-bottomed sections 14a and 14c which are connected to the shallow-bottomed section 14b on both sides. The discharge pipe 16 is connected to the bottom of the deep-bottomed section 14a, and the feed pipe 17 is connected to the bottom of the deep-bottomed section 14c. The deep-bottomed section 14c at the upstream is provided with a horizontal baffle plate 19 to prevent a jet stream of the coagulating solution flowing in from the bottom, and the bottom of the shallow-bottomed section 14b is sloped down toward the downstream to facilitate movement of capsules under coagulation. Thus, when the coagulating solution flows from the storage tank 15 through the feed pipe 17 into the deep-bottomed section 14c, the solution runs against the baffle plate 19, flowing round above the plate, is accelerated into the shallow-bottomed section 14b with no partial upsurge of the solution surface, and flows over the whole area of the shallow-bottomed section at a uniform speed. The coagulating solution with the capsules reaching the deep-bottomed section 14a then flows into the discharge pipe 16, and flows down to the storage tank 15. The discharge pipe 16 is provided at its lower end with two types of nets 20 and 21 with different meshes, and the capsules are separated from the coagulating solution by the upstream net 20. A washing spray 30 is disposed directly above the downstream net 21 and a vessel 31 is disposed directly beneath the downstream net 21. Thus, the capsules are washed with a washing solution sprayed from the washing spray 30 and then fall down to a vessel 22 disposed at the downstream without sticking to each other. Fine particles adhering to the capsules are wash off and flow down to the vessel 31.

On the other hand, the dropping tank 13 is disposed directly above the shallow-bottomed section 14b, and a pipe 24 is provided from a material tank 23 to the top of the dropping tank 13 to supply the dropping tank 13 with the material solution. A pump 25 is disposed in the pipe 24. The front end of the pipe 24 is connected with a horizontal material solution supply pipe which is disposed along the longitudinal direction of the dropping tank 13. The supply pipe 32 has a plurality of nozzles 34 with flow control valves 33 disposed at uniform intervals. Thus, by operating the individual flow control valves 33, even a high-viscosity material solution can be supplied over the whole area of the dipping tank 13 for a uniform liquid level. Specifically, the flow control valve 33 which is closer to the pump 25 is narrowed down where the solution pressure is higher, and that which is more distant from the pump 25 is opened.

Figure 5:
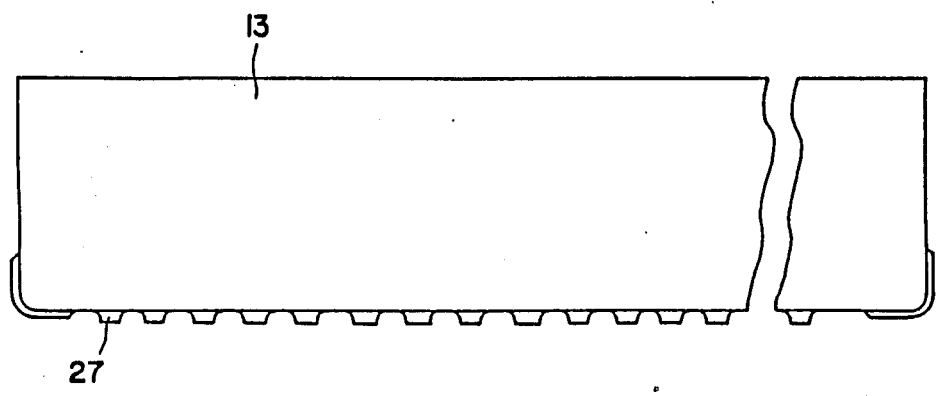
Figure 6:
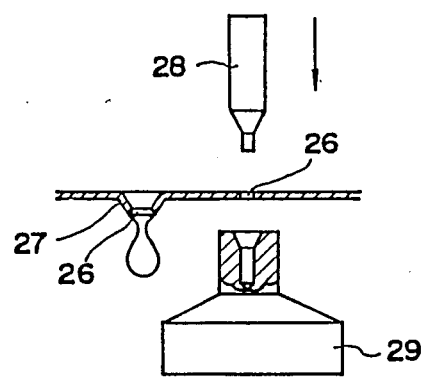
Figure 7:
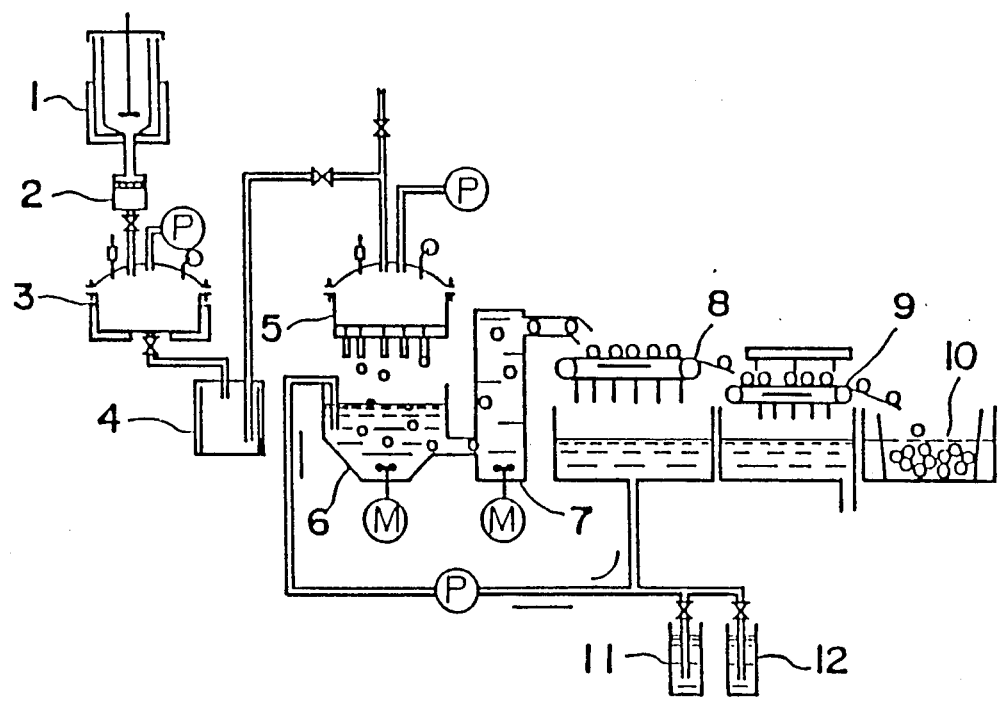
FIG. 7 is a diagrammatic view showing the structure of a conventional art encapsulation apparatus.

A half of the bottom of the dropping tank 13 is provided with a plurality of small holes 26 projecting downward. In other words, peripheral walls 27 surrounding the small holes 26 form cones projecting downward, which can be identified by seeing the dropping tank 13 from the side (FIG. 5). The small holes 26 may be formed projecting downward using any method. For example, as shown in FIG. 6, the bottom of the dropping tank 13 can be previously provided with the small holes 26, which are then formed to project downward using a die 29 and a punch 28. The small holes 26 projecting downward assure the material solution to drop directly downward, preventing the material solution from otherwise flowing along the bottom surface of the dropping tank 13, thereby ensuring a correct dropping amount of the material solution. Since the dropping tank 13 is supported on two supporting rods 35 and 36 at both sides, the dropping tank 13 can be slanted, for example, by using the supporting rod 35 which has a greater diameter than the supporting rod 36 or by removing the supporting rod 35. The encapsulation operation can be interrupted by slanting the dropping tank 13 to the material solution to the portion of the bottom of the dropping tank 13 which is not provided with the small holes 26.

Air blowing nozzles (not shown) to blow compressed air can also be provided below the small holes 26 in order to control the size of the capsules by blowing the material solution drops with air.

The coagulating solution used in the encapsulation apparatus according to the present invention, when a dressing added with a calcium salt is used as the material solution, can be a solution based mainly on a polysaccharide such as alginic acid or pectin. Other than the above combination, a wide variety of the material solutions and coagulating solutions can be used which undergo a cross-linking reaction to form films on the material solution drops to obtain the capsules.

The encapsulation procedure to produce the capsules using the encapsulation apparatus with the above-described arrangement will now be described. The material solution supplied from the material tank 23 through the pipe 24 is adjusted of the flow rate by the individual nozzles 34 of the material solution supply pipe 32 and fed into the dropping tank 13. Thus, the solution level, or the head, in the dropping tank is uniform over the whole area of the dropping tank 13, thereby assuring uniform amounts of the material solution dropping from the small holes and, in turn, uniform size of the resulting capsules. Also, the material solution is dropped in exact amounts from the small holes without flowing along the bottom surface of the dropping tank 13. In the coagulation tank 14, the coagulation solution flows from the deep-bottomed section 14c, through the shallow-bottomed section 14b, toward the deep-bottomed section 14a. When the coagulating solution flows from the deep-bottomed section 14c into the shallow-bottomed section 14b, it is accelerated due to the difference in depth between the sections and a uniform flow rate over the whole area can be obtained. The material solution is dropped into the flowing coagulating solution and, while undergoing a reaction, moves through the shallow-bottomed section 14b toward the downstream. The dropped material solution reacts with the coagulating solution to form films on the surface of the solution drops to obtain capsules, which are collected in the deep-bottomed section 14a, discharged through the discharge pipe 16 onto the net 20 where the capsules are separated from the coagulating solution, washed with water on the net 21, and collected into the vessel 22. Fine particles formed during the dropping of the material solution are liable to adhere to the capsules, but they are washed off during the washing step. The amount of the material solution (per unit of time) to be supplied and that to be dropped from the dropping tank 13 can be set equally. The diameter of the small holes can be adequately determined according to the size of the capsules to be produced. The viscosity of the material solution, and other factors.

As described above with reference to the embodiment, the encapsulation apparatus according to the present invention can control the material solution in the dropping tank at a uniform level to assure constant amounts of the solution dropped from the small holes, thereby producing capsules with a uniform particle diameter. The baffle plate provided in the deep-bottomed section can prevent a jet stream of the coagulating solution, with no partial upsurge of the solution surface, and assures a uniform flow rate in the horizontal direction. Also, since the shallow-bottomed section is shallower than the deep-bottomed section, the coagulating solution is accelerated in the shallow-bottomed section, like river water running over a dam. As a result, the material solution dropped into the shallow-bottomed section flows fast with the coagulating solution, thereby being prevented from sticking to each other, and the reaction time with the coagulating solution is kept constant to eliminate occurrence of capsules with different degrees of reaction.

With the washing spray, the resulting capsules can be prevented from sticking to each other and adherence of fine particles.

Moreover, the dropping tank is provided with the small holes on a half area of its bottom surface and can be moved up and down at the one side, thereby enabling easy interruption of the encapsulation operation.

Since the encapsulation apparatus according to the present invention is designed for a low cost and simple structure without using a conveyor, it can produce a large amount of capsules of constant quality by simple operation and at a reduced production cost.

I claim:

1. An encapsulating apparatus wherein capsules are produced by circulating a coagulating solution in a coagulation tank and dropping a material solution into said coagulating solution, said coagulating solution causing said material solution to coagulate, said apparatus comprising a dropping tank provided with a small hole defining means on its bottom surface, said dropping tank being further provided with a material solution supply pipe disposed along the longitudinal direction of said dropping tank to supply said material solution to said dropping tank, said material solution supply pipe having a plurality of nozzles with flow control valves, said coagulation tank comprising a first section disposed directly beneath said dropping tank and other sections deeper than said first section disposed at the upstream and downstream of said shallow-bottomed section.

2. An encapsulation apparatus for producing capsules as claimed in claim 1, further comprising a washing spray for spraying washing water onto capsules discharged from said coagulation tank.

3. An encapsulation apparatus for producing capsules as claimed in claim 1, further comprising air blowing nozzles disposed below said small holes of said dropping tank to blow compressed air to drops of said material solution.

4. An encapsulation apparatus for producing capsules as claimed in claim 1 in wherein said small holes are provided within a half area of said dropping tank and said dropping tank is movable up and down at its one side.

5. An encapsulation apparatus for producing capsules as claimed in claim 1, wherein the bottom of said shallow-bottomed section is gradually sloped down toward the downstream.

6. An encapsulation apparatus for producing capsules as claimed in claim 1, wherein said coagulation tank has a baffle plate disposed at its upstream deep-bottomed section to prevent a jet stream of said coagulating solution flowing in from the bottom of said coagulation tank.

7. An encapsulation apparatus for producing capsules as claimed in claim 6, further comprising a washing spray for spraying washing water onto capsules discharged from said coagulation tank.

* * * * *